US011327993B2

(12) United States Patent
Keifer et al.

(10) Patent No.: US 11,327,993 B2
(45) Date of Patent: May 10, 2022

(54) SYSTEMS AND METHODS FOR MANAGING AND DELIVERING DIGITAL CONTENT

(71) Applicant: Verizon Patent and Licensing Inc., Arlington, VA (US)

(72) Inventors: Carl Keifer, Pittsburgh, PA (US); Mark Maslyn, Littleton, CO (US); Mohammad Raheel Khalid, Budd Lake, NJ (US); Vito Messina, Somerville, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1072 days.

(21) Appl. No.: 15/936,366

(22) Filed: Mar. 26, 2018

(65) Prior Publication Data
US 2019/0294721 A1    Sep. 26, 2019

(51) Int. Cl.
*G06F 16/25* (2019.01)
*G06F 16/28* (2019.01)
*G06F 16/901* (2019.01)
*G06T 17/00* (2006.01)

(52) U.S. Cl.
CPC .......... *G06F 16/258* (2019.01); *G06F 16/282* (2019.01); *G06F 16/9024* (2019.01); *G06T 17/00* (2013.01)

(58) Field of Classification Search
CPC .. G06F 16/258; G06F 16/282; G06F 16/9024; G06T 17/00
USPC ........................................................ 707/756
See application file for complete search history.

(56) References Cited

U.S. PATENT DOCUMENTS

| | | | | |
|---|---|---|---|---|
| 6,266,053 B1* | 7/2001 | French | ................ | G06T 17/005 345/440 |
| 6,307,558 B1* | 10/2001 | Mao | ................ | G06T 17/20 345/423 |
| 6,466,239 B2* | 10/2002 | Ishikawa | ................ | G06T 15/10 715/850 |
| 6,552,721 B1* | 4/2003 | Ishikawa | ................ | G06F 3/14 345/418 |
| 6,765,574 B1* | 7/2004 | Mao | ................ | G06T 17/005 345/423 |
| 6,970,844 B1* | 11/2005 | Bierenbaum | ................ | G06Q 10/00 705/39 |
| 7,406,436 B1* | 7/2008 | Reisman | ................ | G06Q 30/02 705/7.32 |
| 8,504,994 B2* | 8/2013 | Golender | ................ | G06F 9/547 717/128 |
| 2004/0150640 A1* | 8/2004 | Park | ................ | G06T 17/00 345/419 |

(Continued)

*Primary Examiner* — Mark E Hershley

(57) ABSTRACT

An exemplary system receives a composite digital asset in a first hierarchical data format, the composite digital asset including a plurality of grouped components, converts the composite digital asset to a second hierarchical data format by breaking out the grouped components into individual components and representing the individual components as a plurality of nodes and hierarchical relationships between the nodes in a graph database, and uses the composite digital asset in the second hierarchical data format to generate and stream one or more of the individual components of the composite digital asset in a flat data format over a network to a client device in response to a request, from the client device, to access the one or more of the individual components of the composite digital asset.

20 Claims, 10 Drawing Sheets

(56) References Cited

U.S. PATENT DOCUMENTS

| | | | | |
|---|---|---|---|---|
| 2004/0249801 | A1* | 12/2004 | Kapur | G06F 16/951 |
| 2005/0028101 | A1* | 2/2005 | Vienneau | H04N 5/262 |
| | | | | 715/716 |
| 2006/0041502 | A1* | 2/2006 | Blair | G06Q 30/0641 |
| | | | | 705/37 |
| 2006/0136402 | A1* | 6/2006 | Lee | G06F 16/2465 |
| 2007/0112714 | A1* | 5/2007 | Fairweather | G06K 13/0825 |
| | | | | 706/46 |
| 2008/0215510 | A1* | 9/2008 | Regli | G06T 19/00 |
| | | | | 706/12 |
| 2009/0132285 | A1* | 5/2009 | Jakobovits | G06F 3/0482 |
| | | | | 705/3 |
| 2009/0193034 | A1* | 7/2009 | Hirasaki | G06F 16/957 |
| 2009/0244082 | A1* | 10/2009 | Livingston | G06K 9/4609 |
| | | | | 345/581 |
| 2009/0254572 | A1* | 10/2009 | Redlich | G06Q 10/06 |
| 2010/0100546 | A1* | 4/2010 | Kohler | G06F 16/40 |
| | | | | 707/739 |
| 2010/0250497 | A1* | 9/2010 | Redlich | H04L 63/0227 |
| | | | | 707/661 |
| 2011/0137907 | A1* | 6/2011 | Ikenoue | G06F 16/29 |
| | | | | 707/740 |
| 2011/0261049 | A1* | 10/2011 | Cardno | G06Q 10/10 |
| | | | | 345/419 |
| 2012/0117536 | A1* | 5/2012 | Elmieh | G06F 8/71 |
| | | | | 717/110 |
| 2012/0256915 | A1* | 10/2012 | Jenkins | G06T 15/40 |
| | | | | 345/419 |
| 2012/0259895 | A1* | 10/2012 | Neely, III | G06F 16/367 |
| | | | | 707/798 |
| 2013/0249948 | A1* | 9/2013 | Reitan | G06T 19/006 |
| | | | | 345/633 |
| 2013/0325870 | A1* | 12/2013 | Rouse | G06F 16/353 |
| | | | | 707/741 |
| 2014/0063061 | A1* | 3/2014 | Reitan | G09G 3/003 |
| | | | | 345/633 |
| 2014/0075004 | A1* | 3/2014 | Van Dusen | H04L 41/04 |
| | | | | 709/223 |
| 2016/0012465 | A1* | 1/2016 | Sharp | G06Q 20/386 |
| | | | | 705/14.17 |
| 2016/0104377 | A1* | 4/2016 | French | G08G 1/0129 |
| | | | | 701/117 |
| 2016/0218884 | A1* | 7/2016 | Ebrom | G06F 8/38 |
| 2016/0247175 | A1* | 8/2016 | Milton | G06Q 30/0205 |
| 2016/0373521 | A1* | 12/2016 | Washbrook | H04L 63/107 |
| 2018/0001184 | A1* | 1/2018 | Tran | G06F 1/163 |
| 2018/0024701 | A1* | 1/2018 | Sanches | G06F 40/166 |
| | | | | 715/781 |
| 2018/0188704 | A1* | 7/2018 | Cella | G05B 19/4183 |
| 2019/0068551 | A1* | 2/2019 | Bilsten | G06F 16/5866 |
| 2019/0207807 | A1* | 7/2019 | Mikhail | H04L 41/145 |
| 2019/0268599 | A1* | 8/2019 | Hannuksela | G06T 3/0062 |
| 2019/0349426 | A1* | 11/2019 | Smith | H04L 9/3239 |

\* cited by examiner

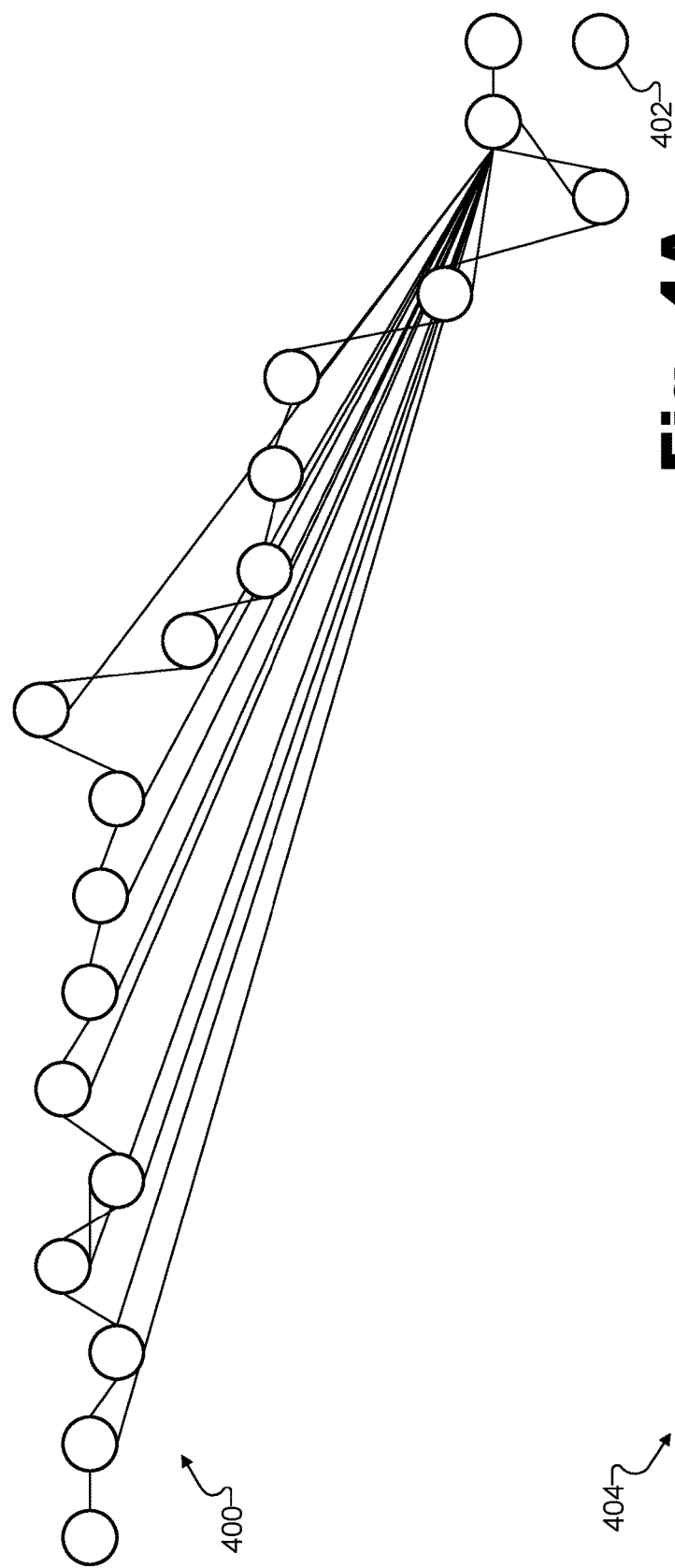
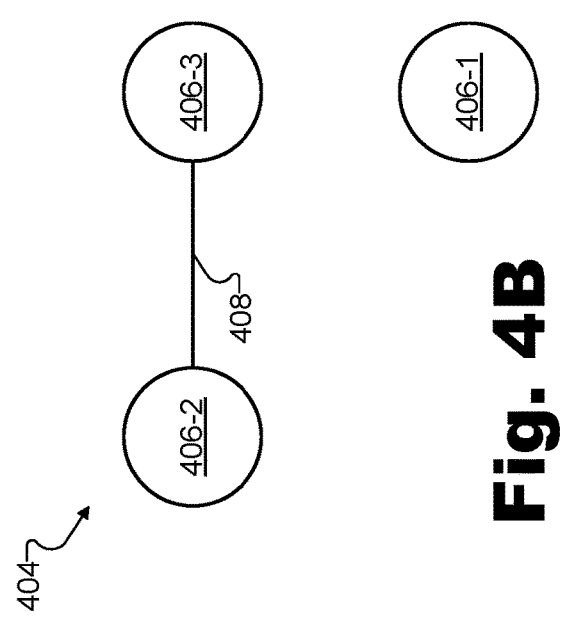
Fig. 4A
Fig. 4B

SYSTEMS AND METHODS FOR MANAGING AND DELIVERING DIGITAL CONTENT

BACKGROUND INFORMATION

In a transmission of digital content from one computing device to another computing device over a network connection, technical limitations of the computing devices, the network connection, and/or the digital content constrain how quickly the digital content can be received and used by the recipient computing device. For example, certain data formats used to represent digital content impose delays into transmission and/or processing times, particularly for complex digital content represented by complex data formats that are implemented as large data files and/or that require encoding, compression, decoding, decompression, loading, and/or other preprocessing operations to be performed between a time that a computing device requests the digital content from a source such as a digital content delivery platform and a time that the computing device is able to use the requested digital content. Because of such technical issues, complex digital content, such as data representing a three-dimensional ("3D") virtual world used for a virtual experience (e.g., a virtual viewing or gaming experience), for example, has been traditionally packaged and downloaded as a large, complex package in its entirety to a computing device for preprocessing (e.g., unpackaging, decompressing, etc.) by the computing device before the computing device is able to use the digital content to provide the experience.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4A-4B illustrate exemplary maps representative of the digital asset illustrated in FIG. 3 according to principles described herein.

DETAILED DESCRIPTION OF PREFERRED EMBODIMENTS

Figure 1:
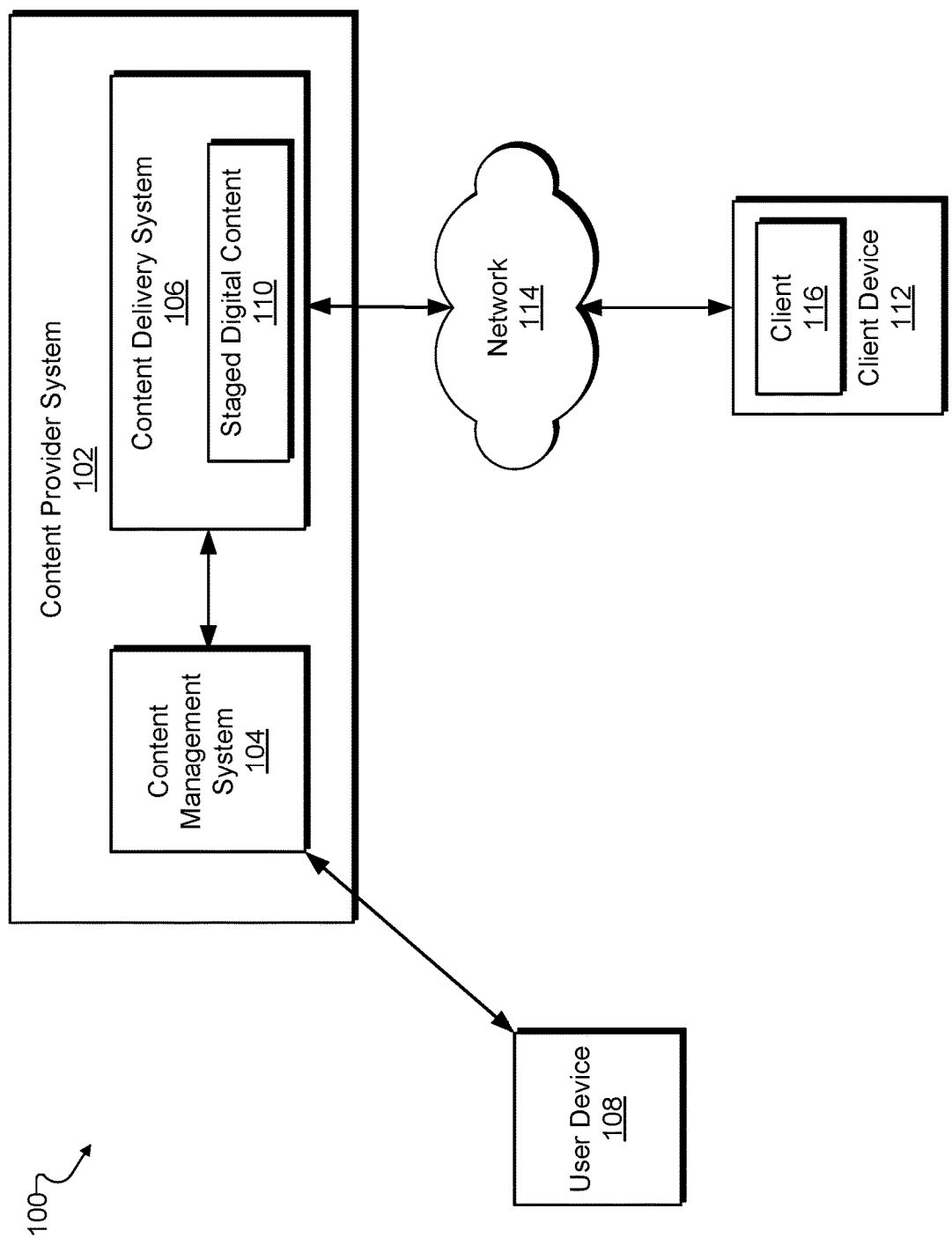
FIG. 1 illustrates an exemplary configuration of systems for managing and delivering digital content according to principles described herein.

Exemplary systems and methods for managing and delivering digital content are described herein. Systems and methods described herein may provide an end-to-end digital content management and delivery (e.g., streaming) platform that provides fast lookup and low-latency delivery and use of digital content. Systems and methods described herein may additionally or alternatively provide digital content management for use by creators and/or providers of digital content.

In certain examples, systems and methods described herein implement a data repository that stores digital content and provide an interface through which one or more users (e.g., digital content creators such as designers and developers) may interact with the digital content, such as by creating, uploading, retrieving, modifying, linking, unlinking, and performing other operations on the digital content. Such systems and methods may be configured to track digital content experiences, such as creation and/or use of digital content stored in the data repository, and to use data representative of the tracked digital content experiences to facilitate efficient creation and use of digital content. Examples of a data repository, user interactions with digital content stored in the data repository, and tracking of digital content experiences are described herein.

In certain examples, systems and methods described herein use digital content stored in the data repository to generate and stream digital content over a network for use by a client device to provide a user experience to a user of the client device. Systems and methods described herein may implement and use one or more specific data formats to represent digital content in a way that facilitates fast lookup and low-latency delivery and use of the digital content. For example, an instance of digital content, referred to herein as a digital asset, may include a plurality of components that are represented as a plurality of nodes and hierarchical relationships between the nodes in a graph database. The representation of the data asset in accordance with such a specific hierarchical data format may facilitate fast lookup and retrieval of the digital asset at a granular level. In addition, systems and methods described herein may use the data asset in the specific hierarchical data format to generate and stream the data asset in a flat data format, which may provide low-latency delivery and use of the streamed digital asset by a client device to provide a user experience. Examples of using specific data formats to represent and stream digital content to facilitate fast lookup and low-latency delivery and use of the digital content are described herein.

Digital content management and delivery systems and methods described herein, including systems and methods that implement and use specific data formats to represent and deliver the digital content, may provide an end-to-end digital content management and delivery (e.g., streaming) platform that supports fast lookup and low-latency delivery and use of digital content. Such systems and methods may support delivery and use of digital content at speeds that are significantly faster than traditional digital content delivery and use on conventional platforms. This may enhance user experiences with digital content. For example, systems and methods described herein may allow digital content to be updated in a cloud data repository and to be delivered to client devices for use by the client devices to provide digital content experiences at speeds not supported by conventional content delivery platforms and without the updated digital content having to be recompiled and downloaded in its entirety before client devices are able to access and use the updated digital content to provide digital content experiences. This may allow a user of a client device to switch between digital content experiences with significantly shorter wait times than traditional wait times for downloading digital content. For example, a user of a client device may quickly switch from accessing and experiencing a first virtual world (e.g., a virtual game, virtual reality experience, mixed-reality experience, or augmented reality experience) to accessing and experiencing a second virtual world (e.g., a different virtual game, virtual reality experience, mixed-reality experience, or augmented reality experience), without the user having to experience traditional wait times caused by downloading, processing (e.g., decompressing and loading), and rendering of the second virtual world in conventional ways that use conventional data formats and content delivery platforms.

Systems and methods described herein may improve computing devices and/or operations of computing devices that manage, deliver (e.g., transmit or receive), and use digital content to provide a user experience, such as by reducing the amount of processing that must be performed for delivery and use of digital content, increasing the speeds at which such processing is performed, reducing memory storage requirements for digital content (e.g., in a data repository and/or in client device memory), and/or by otherwise conserving and/or optimizing usage of computing resources. For example, exemplary specific data formats, as described herein, may facilitate efficient storage of digital content that uses less memory resources compared to conventional digital content storage formats and repositories, as well as efficient processing of digital content that minimizes processing operations performed between a time when the digital content is requested and a time when the digital content is used to provide a user experience. As described herein, for instance, digital content may be maintained in a manner that facilitates granular-level retrieval and delivery over a network that is more efficient (e.g., used less memory, processing, and/or network resources) that delivery of traditional monolithic executables (e.g., an entire virtual game executable). As also described herein, for instance, digital content may be delivered in a flat data format that may be directly loaded into processing unit memory of a client device without having to be decompressed and/or without an additional copy being made in other memory of the client device.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 illustrates an exemplary configuration 100 of systems for managing and delivering digital content. As shown, configuration 100 may include a content provider system 102 that implements a content management system 104 and a content delivery system 106 communicatively coupled one to another. Content management system 104 and content delivery system 106 may each include one or more computing devices, such as one or more server devices, data storage devices, processors, etc., configured (e.g., by instructions tangibly embodied as software, firmware, etc. in a computer-readable medium) to perform operations of content management system 104 and content delivery system 106 described herein.

Content management system 104 may manage digital content in any of the ways described herein, including receiving, processing, storing, and providing digital content. For example, content management system 104 may receive digital content from any suitable source, such as from a user device 108 communicatively coupled to content management system 104, process the digital content, and store the digital content in a data repository (e.g., a database) from which the digital content is made accessible to user device 108 and/or content delivery system 106. Content management system 104 may store the digital content in a specific hierarchical data format in which the digital content is represented by a plurality of nodes and hierarchical relationships between the nodes in a graph database. As described herein, this specific hierarchical data format may facilitate fast lookup and retrieval of the digital content at a granular level. In certain examples, the processing of the digital content by content management system 104 may include converting the digital content from a data format in which the digital content is received by content management system 104 to the specific data format for storage. Examples of such a specific data format and converting data to the specific data format are described herein.

Content management system 104 may provide digital content in the specific data format to content delivery system 106 for use by content delivery system 106 to deliver digital content over a network. Content delivery system 106 may be configured to use the digital content in the specific data format to generate the digital content in a flat data format that may be transmitted by content delivery system 106 to one or more client devices, such as a client device 112, over a network 114. Examples of digital content in the flat data format and benefits provided by use of digital content in the flat data format are described herein.

In certain examples, content delivery system 106 may stage the digital content for delivery. Such staged digital content is illustrated as staged digital content 110 in FIG. 1 and may include digital content represented in the specific data format and/or in the flat data format. Content delivery system 106 may stage the digital content by storing the digital content such that the digital content is ready for access and transmission by content delivery system 106 to one or more client devices, such as client device 112, over network 114 in response to requests for the digital content.

Client device 112 may include a client 116 that is configured to request digital content from content delivery system 106, receive the requested digital content from content delivery system 106, and process the digital content to provide a user experience based on the digital content. In certain examples, client 116 may process the digital content by directing client device 112 to use the digital content to provide a user experience to a user of client device 112, such as by displaying and/or playing visual and/or audible digital content in certain examples. Client 116 may be configured to access digital content piece by piece from content delivery system 106 at a granular level and use the accessed digital content in real time as needed to provide the user experience without having to wait for download and preprocessing of an entire monolithic package of digital content. This may further improve the speed at which client device 112 is able to access and use digital content to provide a digital content experience to a user of client device 112.

Elements of configuration 100 and operations that may be performed by elements of configuration 100 will now be described in more detail.

As mentioned, content management system 104 may include one or more computing devices, such as one or more server devices, data storage devices, processors, etc., configured to perform operations of content management system 104 described herein. In certain implementations, content management system 104 may include a system of cloud computing devices (e.g., cloud servers and data storage devices) configured to provide operations of content management system 104 as one or more cloud computing services to user device 108 and/or content delivery system 106.

Content management system 104 may be configured to receive digital content from any suitable source, such as from user device 108, and using any suitable technologies. For example, content management system 104 may provide an interface that may be accessed by a user of user device 108, such as a creator of digital content, who may utilize user device 108 to interact with the interface to upload digital content to content management system 104.

User device 108 may include any computing device configured to communicate with content management system 104 and/or facilitate interaction of a user of user device 108 with content management system 104. For example, user device 108 may include, without limitation, a mobile computing device such as a smartphone device or a tablet computer, a personal desktop or laptop computer, and any other suitable computing device configured to communicate with content management system 104 using any suitable communications technologies. A user of user device 108 may utilize user device 108 to interact with an interface provided by content management system 104 in any suitable way, including in any of the ways described herein.

An interface provided by content management system 104 for access by user device 108 may include any interface suitable to facilitate interactions between a user of user device 108 and content management system 104. For example, content management system 104 may provide a web or application interface for access by user device 108. In certain examples, content management system 104 may be configured to authenticate a user via the interface, such as by receiving and validating login information for the user.

Content management system 104 may receive digital content from user device 108 by receiving data representative of the digital content transmitted from user device 108 over any suitable connection to content management system 104, such as over a direct or network connection. The data representative of the digital content may be in any suitable form, including in any suitable data structure, file format, transport format, transport protocol format, and/or transport package.

As used herein, "digital content" may include any content that can be represented by digital data (e.g., data represented in text or binary form). For example, digital content may include digitally represented media content such as digital images, video, audio, and/or components thereof. In certain examples, for instance, digital content may include, without limitation, a video, an audio track, an image, a texture, a shader, a material, a two-dimensional ("2D") or three-dimensional ("3D") model (e.g., a model of a 3D object or world such as a virtual object or world), and any combination or sub-combination thereof. These examples of digital content are illustrative only. Digital content may include other digitally represented content, such as text files, word processing documents, calendars, contacts, etc., in other examples.

An instance of digital content may be referred to as a "digital asset," which may include any discrete form of digital content. As an example, a digital asset may be an individual digital content component, such as an image, a texture, a material, or a shader. As another example, a digital asset may be a composite digital asset that includes a plurality of grouped individual digital content components having specific, defined relationships (e.g., a composite digital asset in a package hierarchical data format in which components of the composite digital asset are packaged in accordance with the package hierarchical data format). For example, a composite digital asset may be a virtual object model that includes a group of meshes that define surfaces of the virtual object and textures, shaders, materials, and images linked to the meshes and that define appearances of the surfaces of the virtual object. As another example, a composite digital asset may include a model of a virtual world that includes a group of digital objects having specific, defined relationships to produce a virtual world structure and appearance. As another example, a composite digital asset may include an application or executable, such as a game application, that includes a model of a virtual world and logic configured to be applied to the virtual world during execution of the application or executable. These examples of digital assets are illustrative only. Additional or alternative digital assets may be used in other examples.

In certain examples, content management system 104 may define a set of categories of digital assets and use the defined set of categories to label digital assets as having respective category types. For example, content management system 104 may define a set of categories of digital assets that includes individual component categories such as a material category type, an image category type, a shader category type, and a texture category type, as well as composite asset categories such as a digital experience category type, an executable category type, a model category type, an object category type, and a virtual world category type. Content management system 104 may use any suitable combination or sub-combination of such exemplary categories of digital assets in certain implementations or may use additional or alternative categories of digital assets in other implementations.

A texture digital asset may include data defining a particular texture and/or texturing effect that may be applied during rendering of a virtual model. A shader digital asset may include data defining a shader effect and/or one or more shader operations that may be applied during rendering of a virtual model. An image digital asset may include data defining an image that may be applied during rendering of a virtual model, such as by applying colors defined by the image to a surface, material, or texture of the virtual model. A material digital asset may include data defining a material that may be applied during rendering of a virtual model, such as by applying attributes of the material (e.g., attributes of wood, metal, etc.) to the virtual model. These categories of digital assets may be considered to be categories for individual, component-level digital assets. As described herein, such component digital assets may be represented as standalone nodes in a graph database maintained by content management system 104.

As mentioned, a composite digital asset may include a plurality of grouped components, such as a plurality of grouped component digital assets that have specific, defined relationships between them. For example, a composite digital asset may be a virtual model that includes a group of meshes that define surfaces of the virtual model and texture, shader, material, and image digital assets linked to the meshes and that define appearances of the surfaces of the virtual model. In certain examples, a composite digital asset may be defined in accordance with a package hierarchical data format in which the components of the composite digital asset are packaged in accordance with the package hierarchical data format (e.g., as a package of one or more files).

As mentioned, content management system 104 may receive digital content from user device 108 by receiving data representative of the digital content transmitted from user device 108. For example, content management system 104 may receive a digital asset from user device 108, which digital asset may be assigned any suitable category of digital asset described herein. As an example, content management system 104 may receive an individual component digital asset such as a texture, shader, image, or material digital asset. As another example, content management system 104 may receive a composite digital asset such as a digital asset representing a virtual object, a virtual world, a virtual game, etc.

In certain examples, receipt of a digital asset by content management system 104 may include content management system 104 receiving data that actually represents the digital asset and information about the digital asset. Such information may specify one or more properties of the digital asset, such as a category type assigned to the digital asset, an identifier (e.g., a filename) for the digital asset, a data format for the digital asset, and/or any other information related to the digital asset. In certain implementations, content management system 104 may provide interface tools for use by a user of user device 108 to provide information about the digital asset when preparing to upload the digital asset to content management system 104, such as information indicating a category type and filename for the digital asset. Content management system 104 may be configured to use such information to manage the digital asset. In certain examples, content management system 104 may use a combination of the category type value and the filename value to create a unique identifier for the digital asset in a data repository.

Content management system 104 may receive data representative of a digital asset in any suitable form and/or data format. For example, content management system 104 may be configured to receive a file or set of files (e.g., a packaged file or set of files) that includes data representative of the digital asset in a defined data format, which may be any known and/or suitable data format for representing digital assets such as 2D images, 3D models, and/or components thereof. For example, content management system 104 may be configured to receive a digital asset representing a 3D model in a known data format such as an FBX file, an STL file, an OBJ file and accompanying MTL file, etc. These are examples of hierarchical data file formats that represent hierarchical relationships between grouped digital asset components within a file or set of files. For example, a composite digital asset that represents a 3D model in a hierarchical data format may include a group of meshes that define surfaces of the 3D model and defined relationships between the meshes and textures, shaders, materials, and images that define appearances of the surfaces of the 3D model. Such hierarchical data file formats may be used as known to define data packaged in a particular way to represent a digital asset.

Content management system 104 may process received digital content in any suitable way to prepare the digital content for storage in a specific data format. Processing may include unpackaging, decompressing, decoding, parsing, analyzing, and/or any other processing of the digital content and/or information about the digital content that has been received by content management system 104. To this end, content management system 104 may be configured to parse and interpret digital content data represented in accordance with any suitable data format in which the digital content is received.

Processing of digital content may include content management system 104 converting digital content from a data format in which the digital content is received to a specific data format implemented by content management system 104. For instance, content management system 104 may receive a digital asset represented in a first data format and may perform operations to convert the digital asset to the specific data format, which may be referred to as a second data format. As an example, content management system 104 may receive, in a first data format, a component digital asset such as an image, texture, or material. Content management system 104 may convert the component digital asset to a second data format (i.e., a specific data format implemented by content management system 104) by storing the component digital asset as a standalone node in a graph database. As another example, content management system 104 may receive, in a first hierarchical data format, a composite digital asset including a plurality of grouped components. Content management system 104 may convert the composite digital asset to a second hierarchical data format (i.e., a specific data format implemented by content management system 104) by breaking out the grouped components into individual components and representing the individual components as a plurality of nodes and hierarchical relationships between the nodes in a graph database. By performing such a conversion, content management system 104 may represent the composite digital asset as individual components having certain hierarchical relationships in a manner that facilitates a small data-storage footprint for the digital asset in a data repository, as well as fast lookup and retrieval of the digital asset or one or more individual components of the digital asset.

Figure 2:
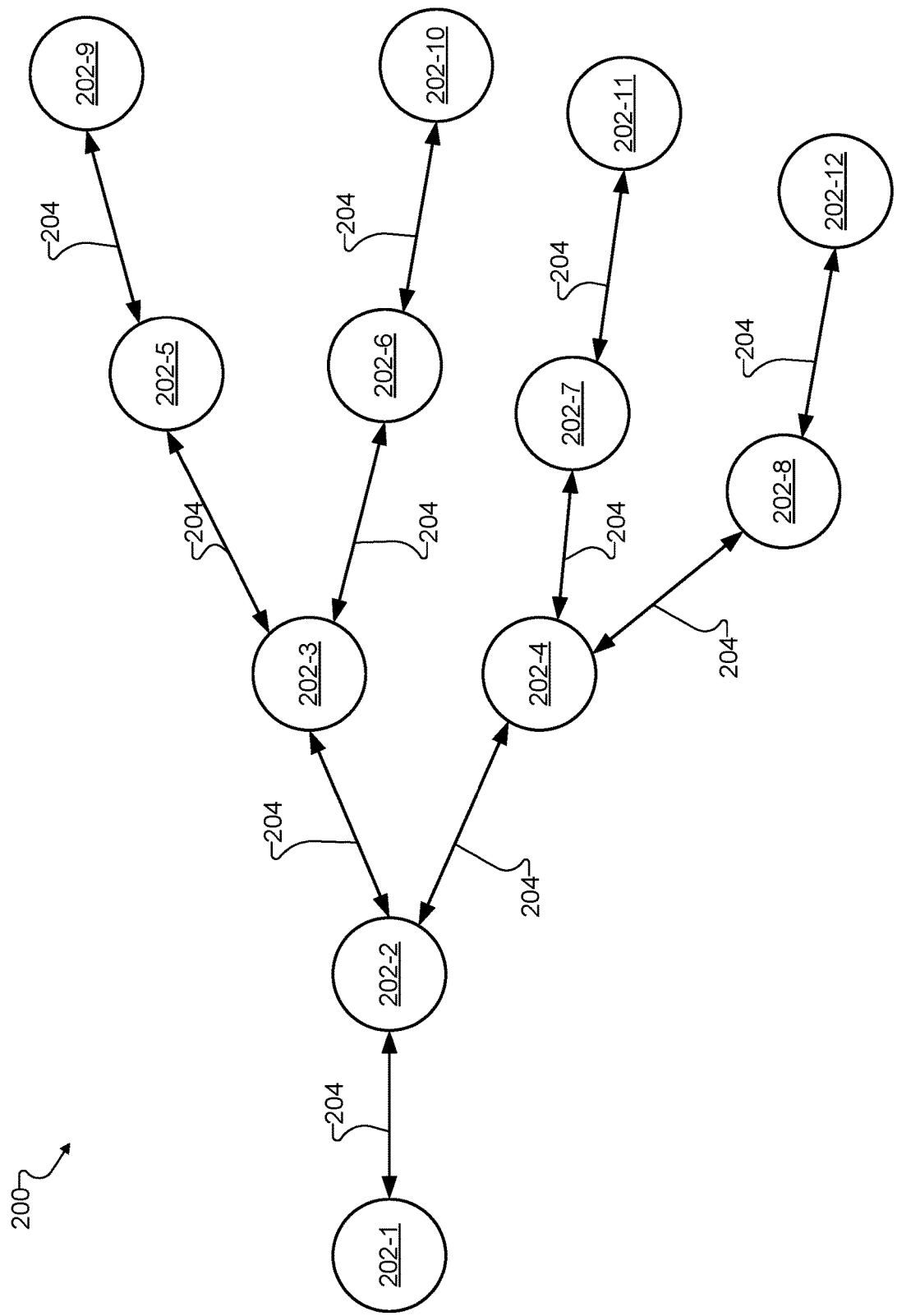
FIG. 2 illustrates an exemplary data format for digital content according to principles described herein.

FIG. 2 illustrates an exemplary specific data format 200 that may be used by content management system 104 to represent digital content stored in a data repository maintained by content management system 104. As shown, data format 200 may include a plurality of nodes 202 (e.g., nodes 202-1 through 202-12) linked by a plurality of edges 204. Edges 204 may represent relationships between nodes 202. As shown, edges 204 may link nodes 202 together hierarchically to represent hierarchical relationships between nodes 202. For example, an edge 204 linking node 202-2 and node 202-1 may indicate that node 202-2 is a child of node 202-1, which may indicate that node 202-2 represents a component of node 202-1. Similarly, node 202-3 may be a child of node 202-2, which may indicate that node 202-3 represents a component of node 202-2. Additional parent-child relationships are illustrated by other edges 204 linking together other nodes 202 in FIG. 2.

Nodes 202 and edges 204 may form elements in a graph database maintained and used by content management system 104 to store digital content. Accordingly, content management system 104 may represent digital content as nodes 202 and edges 204 in the graph database in a manner that represents hierarchical relationships between components of the digital content. To illustrate, a digital asset that includes a 3D model, materials, textures, and images may be represented by specific data format 200 as follows. Node 202-1 may represent a root node for the digital asset, and node 202-2, which is linked to node 202-1 by an edge 204, may represent a 3D model (e.g., one or more meshes) of a 3D object that is a component of the digital asset. Nodes 202-3 and 202-4, which are linked to node 202-2 by respective edges 204, may represent materials that are components of the 3D model. Nodes 202-5 and 202-6, which are linked to node 202-3 by respective edges 204, may represent textures that are components of the material represented by node 202-3. Nodes 202-7 and 202-8, which are linked to node 202-4 by respective edges 204, may represent textures that are components of the material represented by node 202-4. Node 202-9, which is linked to node 202-5 by an edge 204, may represent an image that is a component of the texture represented by node 202-5. Node 202-10, which is linked to node 202-6 by an edge 204, may represent an image that is a component of the texture represented by node 202-6. Node 202-11, which is linked to node 202-7 by an edge 204, may represent an image that is a component of the texture represented by node 202-7. Node 202-12, which is linked to node 202-8 by an edge 204, may represent an image that is a component of the texture represented by node 202-8. Such a representation of a digital asset in a graph database in accordance with specific data format 200 may be referred to as a map of the digital asset.

In a data repository maintained by content management system 104, a node of a graph database may be linked to one or more other nodes in any suitable way to represent relationships between the digital asset represented by the node and one or more other digital assets represented by the one or more other nodes. In some examples, a node may be included in the graph database and not linked to any other node. Such a node may be linked to one or more other nodes at any suitable time, such as in response to user input to link the node to one or more other nodes.

Content management system 104 may be configured to link a node of a graph database to multiple other nodes of the graph database. Accordingly, a digital asset represented by a node may be linked to multiple other digital assets, which may allow content management system 104 to reuse a digital asset that was created as part of a particular set of digital content in another set of digital content by linking the node for the digital asset to a node associated with the other set of digital content, without having to create a duplicative copy of the digital asset in another node. This may help to minimize the data-storage footprint of digital content in the data repository.

To this end, in certain examples, content management system 104 may be configured to identify opportunities to reuse digital content. For example, content management system 104 may receive a digital asset and evaluate the digital asset to identify any components of the digital asset that may already be represented in the data repository. When content management system 104 identifies a component of the digital asset that is already represented in the data repository (e.g., a particular texture or material that is already represented in the data repository), content management system 104 may create a link to the node that represents the component that already exists in the data repository instead of creating a new node to represent the component included in the digital asset that was received and is being processed by content management system 104. This example is illustrative only. Content management system 104 may be configured to evaluate digital content to identify additional or alternative optimizations that may be performed on the digital content in the data repository.

Referring again to FIG. 2, nodes 202 may be part of a graph database and may represent information about digital assets and digital asset components. For example, a node 202 may include data representing actual digital content or information indicating a location at which the actual digital content may be accessed, such as a uniform resource identifier ("URI") (e.g., a uniform resource locator ("URL")) that indicates a location at which the actual digital may be accessed. A node 202 may additionally include data specifying a category type of the digital content represented by the node 202, an identifier used by content management system 104 to identify the node 202 and/or the associated digital content in a data repository, and/or any other information related to the node 202 and/or the digital content represented by the node 202.

The example illustrated in FIG. 2 is exemplary only. Content management system 104 may represent any digital content in a graph database using nodes and edges of the graph database to represent digital assets, components, and hierarchical relationships of the digital content. By using a graph database to represent digital content in this manner, content management system 104 may provide flexible management of digital content, such as by allowing changes and additions to digital content to be made flexibly and efficiently (e.g., in real time), simultaneous queries, and fast lookups and retrievals of digital content at granular levels (e.g., component levels). Such benefits may support fast lookup and retrieval of digital content at a granular level.

After content management system 104 processes received digital content, content management system 104 may store the digital content in a data repository. As described, the data repository may include a graph database. The data repository, including the graph database, may be implemented by content management system 104 using any suitable data storage and graph database technologies.

In addition to receiving, processing, and storing digital content, content management system 104 may perform other digital content management operations. For example, content management system 104 may be configured to retrieve and provide stored digital content and/or information about stored digital content. For instance, content management system 104 may provide a user of user device 108 with access to stored digital content and/or information about the stored digital content, subject to permissions of the user. Additionally or alternatively, content management system 104 may provide content delivery system 106 with access to the stored digital content and/or information about the stored digital content. This access may facilitate content delivery system 106 delivering digital content over network 114 such as described herein.

Content management system 104 may also be configured to perform content management operations such as replacing, modifying, updating, deleting, linking, unlinking, and any other content management operations on stored digital content. Such operations may be performed by content management system 104 in response to user requests received from user devices such as user device 108. Accordingly, a user of user device 108 may interact with content management system 104 to control management of digital content stored by content management system 104.

For simplicity, certain examples of digital content management by content management system 104 have been described in relation to a single user device 108 operated by a user to interact with content management system 104. However, content management system 104 may be configured to interface with any suitable number of user devices in relation to managing digital content. In certain examples, access to stored digital content may be shared to allow users of services provided by content management system 104 to collaborate in creating and managing digital content, including by using digital content stored by content management system 104 to create and upload updated and/or new digital content to content management system 104. For example, a user who is creating a virtual world for a virtual game may search for, retrieve, and add a digital asset stored by content management system 104 to the virtual world.

In certain examples, content management system 104 may perform content management operations in real time to facilitate real time updates to digital content managed by content management system 104 and real time providing of the updated digital content to content delivery system 106 for delivery. Accordingly, content creators may provide new or modified digital content to content management system 104, and content management system 104 and content delivery system 106 may perform operations described herein in real time such that the new or modified digital content is available for delivery over network 114 to client devices in real time.

In certain examples, content management system 104 may be configured to maintain two separate maps of a digital asset. The maps may be maintained as separate and/or independent data structures, such as separate graphs in a graph database and/or as separate graph databases, for example. One of the maps, which may be referred to as a build map, may include data representative the digital asset and operations performed to build the digital asset. For example, a build map of the digital asset may include data representative of the digital asset that may be used for processing the digital asset to provide a user experience and data representative of steps that a user of user device 108 performed to build the digital asset. The build map may preserve a build history of the digital asset and may be used to facilitate efficient rebuilding, modifying, and updating of the digital asset. For example, the build map may be used to adjust a step that was performed during creation of the digital asset, such as by changing a texture component that was selected for the digital asset at creation. As another example, a user may use the build map to conveniently add to the digital asset without the user having to rebuild the digital asset.

Content management system 104 may be configured to track operations performed to create a digital asset and record the tracked operations in the build map for the digital asset. This may help content management system 104 build a repository of digital content that is secure and pristine.

Another map, which may be referred to as a delivery map, may be generated by content management system 104 and may include only data representative the digital asset that is useful for processing the digital asset to provide a user experience based on the digital asset. The delivery map may omit digital asset build history data, which may allow the delivery map to be read faster and to be considerably smaller than the build map for the digital asset. Content management system 104 may be configured to provide the delivery map for the digital asset to content delivery system 106 for use by content delivery system 106 for delivery of the digital asset over network 114.

Figure 3:
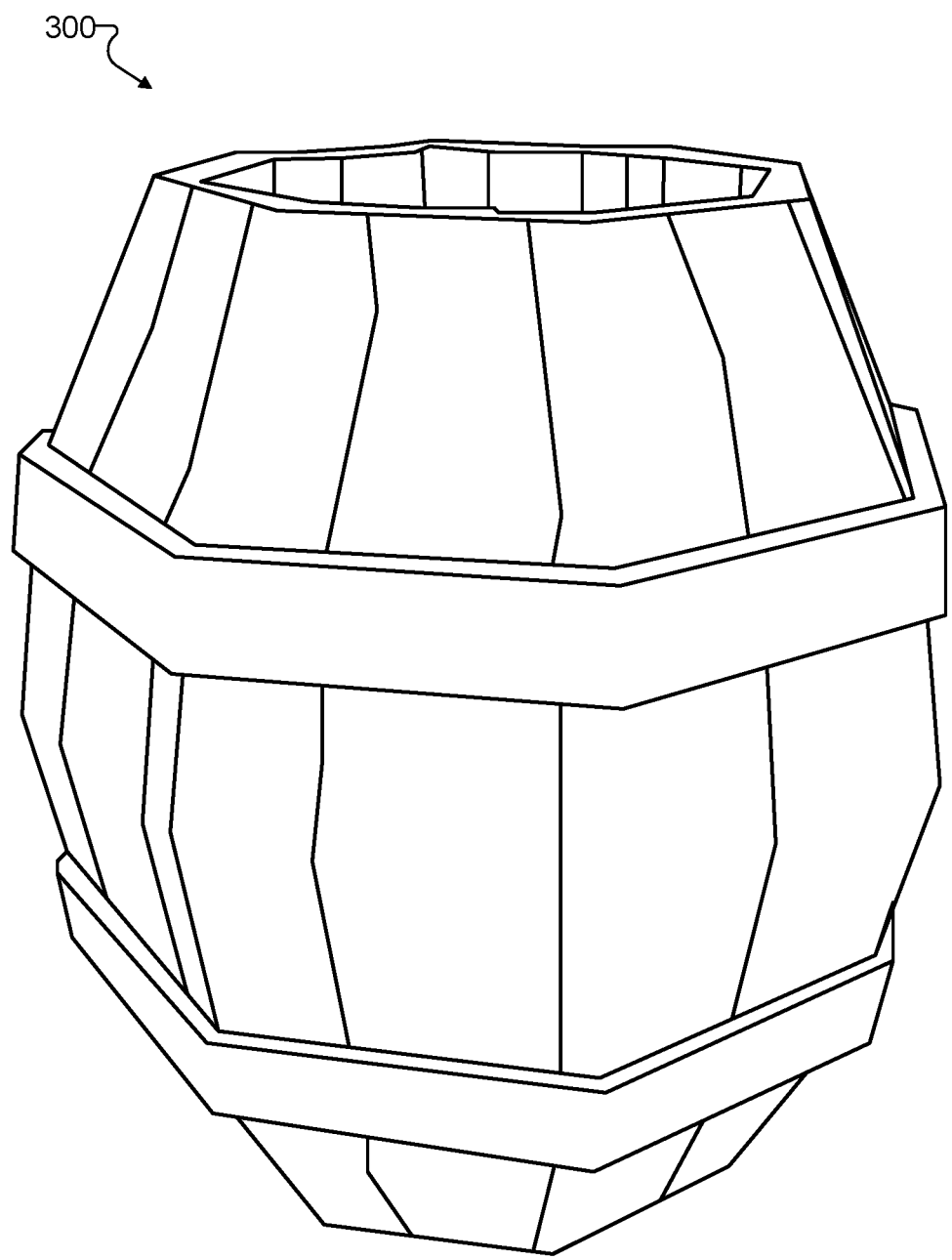
FIG. 3 illustrates a perspective view of an exemplary digital asset that may be represented in accordance with an exemplary data format according to principles described herein.

To further illustrate, exemplary build and delivery maps for a virtual object model will now be described. FIG. 3 illustrates a perspective view of an exemplary virtual object model 300. As shown, virtual object model 300 may represent a 3D virtual object in the form of a barrel. Virtual object model 300 may include a plurality of grouped components that represent the barrel. For example, although FIG. 3 represents the barrel as a relatively simple line drawing without color, texture, and lighting applied for simplicity in drawing, in a particular implementation, virtual object model 300 may include 218 vertices, 432 edges, 216 faces, 432 triangles, and 261 UV textures grouped to represent a barrel having a specific shape, size, and appearance (e.g., represented as specific meshes, materials, shaders, textures, and images). For such an exemplary implementation, FIG. 4A illustrates an exemplary build map 400 in which circles represent nodes and lines interconnecting the nodes represent relationships between the nodes. Build map 400 may include a node 402 that represents a top level of virtual object model 300. Other nodes and the interconnecting lines may represent components of virtual object model 300 and relationships between the components. Certain nodes and lines of build map 400 may represent a history of build operations that were performed to create virtual object model 300. For the same exemplary implementation, FIG. 4B illustrates an exemplary delivery map 404 that includes a node 406-1 representing a top level of virtual object model 300, a node 406-2 representing how meshes are packed, inside the top-level model file represented by node 406-1, to represent a shape of the barrel, a node 406-3 that represents a material object to be applied to the packed meshes to render the appearance of the barrel, and a link 408 representing a relationship between nodes 406-2 and 406-3 and indicating that the packed mesh of node 406-2 needs the material of 406-3 for rendering.

As shown in FIGS. 4A-4B, delivery map 404 is considerably smaller and less complex that build map 402, which makes delivery map 404 more suitable than build map 402 for use in delivery of the digital asset. Thus, content management system 104 may maintain build map 400 for use in content management operations and may generate, store, and provide delivery map 404 for use by content delivery system 106 in content delivery operations.

Content management system 104 may generate a delivery map in any suitable way. For example, content management system 104 may generate a build map for a digital asset by tracking operations performed to create the digital asset, such as processing operations performed to intake an uploaded digital asset. Content management system 104 may perform operations to collapse the build map for the digital asset, such as by removing data representative of a build history for the digital asset and leaving only data representative of the digital asset that is useful for rendering the digital asset.

In certain examples, content management system 104 may update a build map for a digital asset as requested by a content creator and push the updates through to a delivery map for the digital asset in real time (e.g., by generating a new delivery map to replace the previous version of the delivery map) such that the updates may be propagated from content creator down to user experiences in real time.

Figure 5:
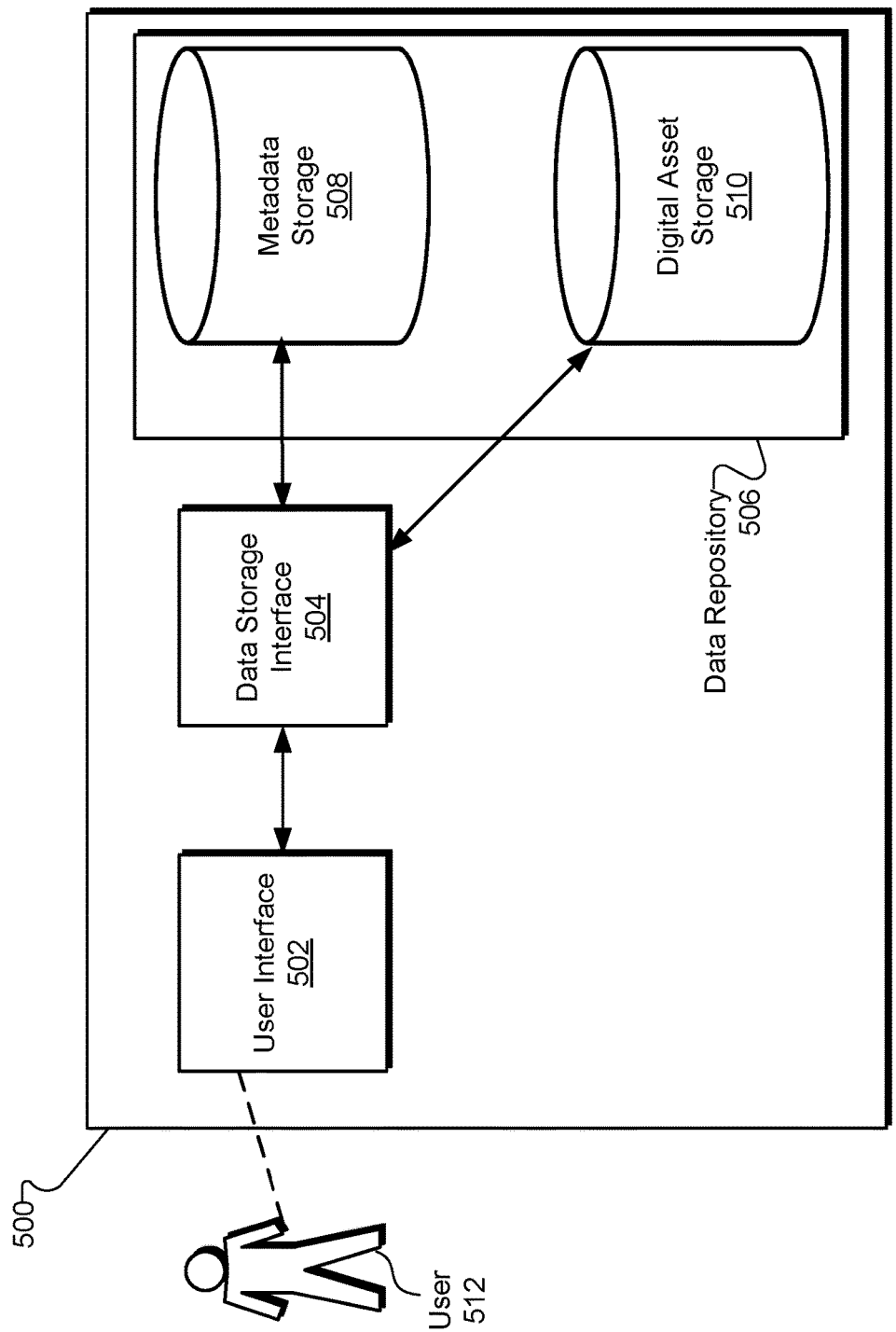
FIG. 5 illustrates an exemplary digital content management system according to principles described herein.

FIG. 5 illustrates an exemplary digital content management system 500 ("content management system 500"), which may be an exemplary implementation of content management system 104. As shown, content management system 500 may include a user interface 502, a data storage interface 504, and a data repository 506 that includes a metadata storage 508 and a digital asset storage 510, which elements are communicatively coupled one to another as represented by arrows in FIG. 5.

Content management system 500 may provide user interface 502 to facilitate interaction between content management system 500 and one or more users of content management system 500, such as a user 512 (e.g., a content creator such as a graphics artist, a designer, a developer, etc.) who may utilize a user device such as user device 108 to access user interface 502. User interface 502 may be implemented in any suitable form and using any suitable user interface technologies. In certain examples, user interface 502 may be implemented as a web interface (e.g., a web site programmed at least in part with scripting code), as a client application interface, and/or as any suitable graphical user interface. In certain examples, content management system 500 may provide user interface 502 to user device 108 (e.g., to a web browser software application or a client application executing on user device 108), which may provide (e.g., display) the user interface 502 to a user of user device 108. Through user interface 502, user 512 may interact with content management system 500 in any of the ways described herein, including to create, upload, retrieve, modify, update, link, unlink, and delete digital content managed by content management system 500.

Data storage interface 504 may be configured to function as an interface between user interface 502 and data repository 506. In certain examples, data storage interface 504 may include a database interface and may be implemented using any suitable technologies, such as REST, Java, SQL, WSDL, and/or SOAP application programming interfaces. In certain implementations, data storage interface 504 may be implemented as a web application or service providing a REST application program interface to a database implemented by metadata storage 506.

Digital asset storage 510 may include any data repository that stores digital content such as digital assets uploaded to content management system 500. Data storage interface 504 may be configured to communicate with digital asset storage 510 to manage digital assets stored therein, including storing digital assets to digital asset storage 510, retrieving digital assets from digital asset storage 510, modifying digital assets stored in digital asset storage 510, and deleting digital assets from digital asset storage 510. Digital asset storage 510 may be implemented with any suitable digital data storage technologies, including any suitable computer-readable media for storing digital data.

Metadata storage 508 may include any data repository (e.g., a database) that stores metadata for the digital content (e.g., digital assets) stored in digital asset storage 510. In certain examples, metadata storage 508 may include or be implemented as one or more graph databases such as described herein. Metadata for digital content, which may be stored in metadata storage 508, may include any information about digital assets, such as information specifying categories, identifiers, storage locations, and/or any properties of digital assets. For example, the metadata for a digital asset may include information stored in a node or a set of nodes and information indicating relationships between the nodes in a graph database. Thus, such metadata may specify components of the digital asset and relationships between those components, as represented in a graph database.

User interface 502, data storage interface 504, metadata storage 508, and digital asset storage 510 may be configured, in any suitable way, to perform digital content management operations described herein. As an example of uploading a digital asset, for instance, user interface 502 may receive data representative of a digital asset uploaded by user 512, as well as data indicating a category type and an identifier for the digital asset. User interface 502 may send data representative of the category type and the identifier to data storage interface 504 (e.g., via a REST call). Data storage interface 504 may receive the data and create an entry for the digital asset in a graph database in data repository 506 and return a location identifier for the digital asset in the data repository. User interface 502 and/or data storage interface 504 may then provide data representative of the digital asset to data repository 506 for storage at the location indicated by the location identifier.

As an example of retrieving a digital asset, user interface 502 may receive, from user 512 for example, information indicating a digital asset to be retrieved. User interface 502 may send the information to data storage interface 504, which may retrieve a location identifier for the digital asset from metadata storage 508. Data storage interface 504 may use the location identifier to retrieve, from digital asset storage 510, the digital asset from the specified location in digital asset storage 510.

As an example of retrieving information about a digital asset, user interface 502 may receive, from user 512 for example, a request for information about all links of a digital asset. The request may include information identifying the digital asset. User interface 502 may send the information to data storage interface 504, which may identify the digital asset and retrieve, from metadata storage 508, data representing all links of the digital asset represented in metadata storage 508. Data storage interface 504 may provide the data representing the links of the digital asset to user interface 502 (e.g., a list of links as represented by a JSON string object), and user interface 502 may use the data to present information about the links of the digital asset to user 512.

These exemplary operations are illustrative only. Additional or alternative operations may be similarly performed by user interface 502, data storage interface 504, metadata storage 508, and digital asset storage 510 in other examples.

Content management system 500 may represent one exemplary implementation of content management system 104. Content management system 104 may be implemented in other suitable ways in other examples.

Returning to FIG. 1, content management system 104 and content delivery system 106 may interface with one another to facilitate content management system 104 providing content delivery system 106 with access to digital content maintained by content management system 104. Content management system 104 may provide digital content, such as digital content stored in the specific data format as described above (e.g., a delivery map for a digital asset), to content delivery system 106 in response to a request for the digital content received from Content delivery system 106. Content delivery system 106 may request digital content from content management system 104 in response to content delivery system 106 receiving a request for the digital content from a client device or in advance of content delivery system 106 receiving any request for the digital content.

Content delivery system 106 may receive and use the digital content to deliver the digital content over network 114 to one or more client devices, such as client device 112, for use by the client devices to provide user experiences based on the digital content. For example, content delivery system 106 may receive a request for digital content from a client device such as client device 112 and, in response, use digital content accessed from content management system 104 (e.g., digital content in the specific data format) to generate and stream the digital content in a flat data format over network 114 to client device 112, which may be configured to receive and process the streamed digital content in the flat data format to provide a user experience with the digital content.

In certain examples, content delivery system 106 may process the digital content to prepare it for delivery over network 114. For example, content delivery system 106 may use the digital content accessed from content management system 104 to generate the digital content in a flat data format. As described herein, the digital content in the flat data format may provide one or more benefits such as supporting low-latency and/or low-bandwidth delivery (e.g., streaming) of the digital content over network 114 to a client device and low-latency access to and use of the digital content by the client device to provide a user experience based on the digital content. Examples of digital content in a flat data format are described herein.

In certain examples, the processing of the digital content by content delivery system 106 may additionally include staging the digital content in the specific data format in which it was received, in the flat data format, or in a combination of the specific data format and the flat data format. Content delivery system 106 may stage the digital content by storing it in one or more content staging storages (e.g., in a content delivery network, cloud server, edge server, etc.) such that the digital content is ready to be accessed, processed, and transmitted over network 114 to one or more client devices.

Content delivery system 106, client device 112, and examples of operations that may be performed by content delivery system 106 and client device 112 to deliver and use digital content in a flat data format will now be described in more detail.

Client device 112 may include any computing device configured to perform client-side operations described herein. Client device 112 may include, without limitation, a mobile device such as a smartphone device or a tablet computer, a personal desktop or laptop computer, a gaming device, a virtual reality device such as a virtual reality headset, an augmented reality device such as an augmented reality headset, a media player device configured to receive, process, and present media content, and/or any other computing device or combination of computing devices configured to access digital content from content delivery system 106 over network 114 and to use the digital content to provide a user experience to a user of client device 112.

Client device 112 may implement client 116, which may include a client application installed and configured to execute on client device 112. Client 116 may be configured to direct client device 112 to perform one or more of the client-side operations described herein. Client 116 may be implemented as software, firmware, hardware, or any suitable combination thereof. Client 116 may be configured to direct client device 112 to access digital content from content delivery system 106 over network 114 and use the digital content to provide a user of client device 112 with a user experience based on the digital content. Client 116 may include a virtual reality client, an augmented reality client, a gaming client, an artificial intelligence client, a media player client, a virtual assistant client, an engine (e.g., a game engine, a media player engine, etc.), and/or any other client that may be implemented by client device 112. As an example, client 116 may include a virtual reality client that includes a rendering component for rendering views of a virtual reality world for presentation to a user of client device 106. As another example, client 116 may include an augmented reality client including a computer vision object recognition component for detecting object attributes that trigger generation of augmented reality views. As another example, client 116 may include a gaming client (e.g., a game engine) that includes a rendering component, a physics component, etc. for providing a virtual game experience.

Client 116 may be configured to direct client device 112 to request any digital asset or set of digital assets from content delivery system 106. In certain implementations, client 116 may be configured to request digital assets at a granular level, such as a digital asset component level, which may allow client 116 to access and process specific digital assets as needed instead of having to access and preprocess an entire monolithic digital asset package before being able to use digital assets in the package. For example, instead of having to download and preprocess an entire virtual world before being able to render a view of the virtual world, client 116 may access and use select elements of the virtual world, such as specific digital assets included in the virtual world, to begin rendering the view of the virtual world without having to wait for the entire virtual world to be downloaded and preprocessed. This may help client 116 switch from streaming and presenting one virtual world to streaming and presenting another virtual world more quickly than is possible with conventional virtual world platforms.

Client 116 may direct client device 112 to request a digital asset from content delivery system 106, and client device 112 may send a request for the digital asset to content delivery system 106 over network 114. Network 114 may include any provider-specific wired or wireless network (e.g., a cable or satellite carrier network or a mobile telephone network), the Internet, the World Wide Web, a wide area network, any other suitable network, or any combination of such networks. Data communications may flow between content delivery system 106 and client device 112 via network 114 using any communication technologies, devices, media, and protocols supportive of data communications, including, but not limited to, socket connections, Ethernet, data transmission media, communication devices, Transmission Control Protocol ("TCP"), Internet Protocol ("IP"), Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), third-generation ("4G") wireless network technologies, fourth-generation ("4G") wireless network technologies such as 4G Long Term Evolution ("LTE") technologies, fifth-generation ("5G") wireless network technologies, Time Division Multiple Access ("TDMA") technologies, radio frequency ("RF") signaling technologies, wireless communication technologies, in-band and out-of-band signaling technologies, and other suitable communications technologies. While only one network 114 is shown to interconnect content delivery system 106 and client device 112 in FIG. 1, it will be recognized that content delivery system 106 and client device 112 may communicate with one another by way of one or more interconnected networks as may serve a particular implementation.

In certain implementations, network 114 may include a mobile wireless network to which client device 112 may connect. To this end, network 114 may include appropriately configured components of a mobile wireless network such as radio access networks, wireless communication base stations, eNodeB elements, central offices, backhaul networks, core networks, etc. In certain implementations, network 114 may provide low-latency data communications by implementing 5G wireless network technologies.

Content delivery system 106 may receive the request for the digital asset from client device 112 and, in response, access the requested digital asset from staged digital content 110 or from content management system 104. Content delivery system 106 may use information included in the request to access the digital asset in any suitable way, including by leveraging attributes of a graph database to perform a fast lookup of the digital asset in the specific data format in the graph database.

In further response to the request, content delivery system 106 may use the digital asset in the specific data format to dynamically generate and stream the digital asset in a flat data format over network 114 to client device 112. Content delivery system 106 may be configured to perform any suitable operations to use the digital asset in the specific data format to generate the digital asset in a flat data format, including operations to serialize the digital asset into the flat data format. Any suitable flat data format may be implemented by content delivery system 106, such as FlatBuffers, Protocol Buffers, Thrift, Apache Avro, SBE, or any other suitable software library implementing a data serialization format.

In certain alternative examples, content delivery system 106 may generate the digital asset in a flat data format in advance of receiving the request for the digital asset from client device 112. In such examples, the digital asset in the flat data format may be staged as part of staged digital content 110, and content delivery system 106 may access the digital asset in the flat data format from staged digital content 110 in response to the request from client device 112.

Content delivery system 106 may stream the digital asset in the flat data format over network 114 to client device 112 in any suitable way and using any suitable data transmission and/or transport technologies. In certain examples, content delivery system 106 may stream the digital asset in the flat data format in real time in response to the request for the digital asset received from client device 112.

Client device 112 may use the streamed digital asset in the flat data format to provide a user experience based on the digital asset. To this end, in certain examples, client 116 may be configured to access and process the streamed digital asset in the flat data format and to direct client device 112 to generate and provide the user experience based on the digital asset. In certain examples, the flat data format in which the digital asset is received may represent the digital asset data in a serialized, binary, and directly loadable and useable state that allows client 116 to receive, load, and use the digital asset data with low latency and without having to unpackage, parse, decompress, or make additional copies of the data (e.g., to memory outside of the buffer that is used for processing the data). In certain examples, the flat data format may allow the digital asset data to flow directly to processing and/or memory of a graphics processing unit ("GPU") for GPU processing without any delay from having to first decompress, unpackage, parse, or copy the data. As such, the digital asset data may be loaded directly into GPU buffer memory and/or go directly through a GPU decoder such that the data is instantly useable by client 116 to provide a user experience. After the data is used, the data may be discarded. There is no need for the data to have a static, at-rest place on client device 112 (e.g., inside of device ROM).

The use of a flat data format for delivery of a digital asset from content delivery system 106 to client device 112 over network 114, as described herein, may provide one or more benefits, including low-latency and/or dynamic access to and use of the streamed digital asset by client device 112 to provide a user experience based on the digital asset. The flat data format may conserve computing resources by reducing the use of processing and memory resources of client device 112 and/or elements of network 114. To illustrate, a digital asset that is a six-sided cube with one diffuse texture map may be represented, in an exemplary flat data format, as a composite digital asset that includes a model category type asset, a material category type component, and a texture category type texture. In certain examples, the composite digital asset in this flat data format may use 1.75 KB of memory space for the uncompressed model and 0.9 KB of memory space for the uncompressed material. In contrast, if the same six-sided cube with one diffuse texture map were represented in a conventional FBX file, the digital asset in the FBX file format may use at least 20 KB of memory space.

The flat data format may reduce the processing performed by client device 112 in another way. For example, because the data is received in the flat data format, client 116 is not required to determine what to do with data every time a data instance is received. Rather, the data has been pre-digested and generated in the flat data format such that when client device 112 running an application (e.g., client 116) receives the digital asset in the flat data format, client device 112 may simply get a pointer to a stream or file for the digital asset, copy the stream or file to a GPU, and run the application to provide a user experience (e.g., a gameplay experience, a virtual reality experience, an augmented reality experience, etc.). Thus, the flat data format may reduce load times and file sizes for client 116, which may help support low-latency delivery and use of digital content to provide a user experience.

In certain implementations, data representing a digital asset (e.g., a digital asset having a model category type), when represented in an exemplary flat data format, may include a first number of bytes (e.g., 16 bytes) that may be a bitwise mask (e.g., a bitwise OR mask) and that may indicate content of the digital asset and/or a location of the digital asset in a digital content delivery pipeline. The data representing the digital asset, when represented in the exemplary flat data format, may also include information packets configured to be used by one or more data processing tools in the digital content delivery pipeline. The data representing the digital asset, when represented in the exemplary flat data format, may also include multiple strings, including a string for interleaved vertex data and a string for an element array buffer. In certain examples, content delivery system 106 may use a reinterpret_cast function to a unit8_t type, or similar function and type, such that the data is represented as a long string of unsigned bytes in the flat data format.

Client 116 may be configured to access and/or use digital content in the flat data format piece by piece at a granular level as needed. To this end, client 116 may be configured to identify a data object at any position in a stream (e.g., at a beginning, midway, or end of a stream) and request only pieces needed by client 116. Content delivery system 106 may support such granular retrieval and use of digital assets in any suitable way, such as chunking and sending granular pieces of digital content. For example, content delivery system 106 may chunk files into a transport stream (e.g., an HLS or MPEG Dash transport stream) at a component level. Based on a streaming wrapper, client 116 may identify a data object at any position in the stream and request only pieces needed by client 116.

Figure 6:
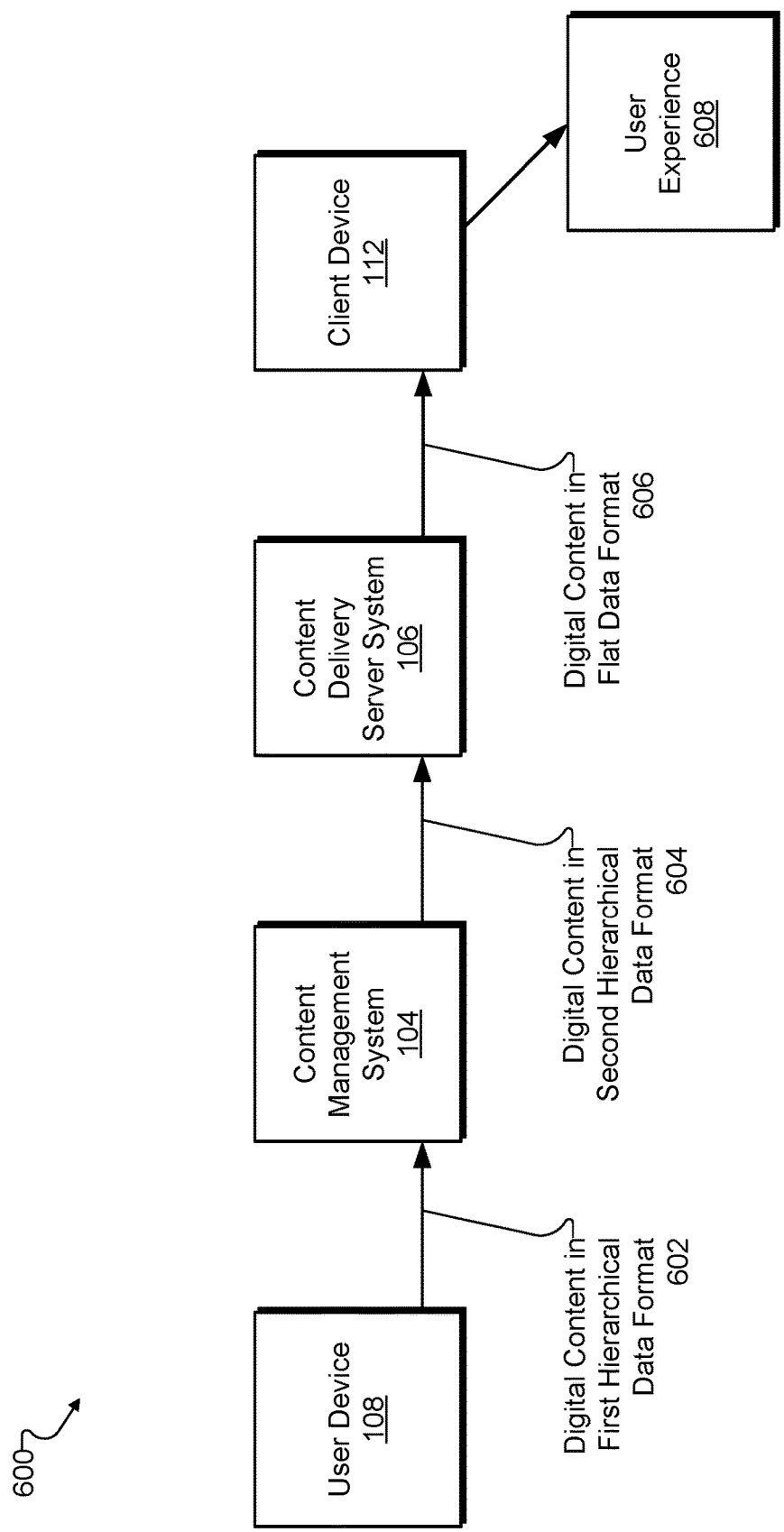
FIG. 6 illustrates an exemplary pipeline for management and delivery of digital content according to principles described herein.

FIG. 6 illustrates an exemplary use of data file formats in a pipeline 600 for management and delivery of digital content. As shown, content management system 104 may receive digital content in a first hierarchical data format 602 from user device 108. Content management system 104 may process the received data as described herein to generate and store the digital content in a second hierarchical data format 604. As further shown, content management system 104 may provide the digital content in the second hierarchical data format 604 to content delivery system 106. Content delivery system 106 may use the received data as described herein to generate and stream the digital content in a flat data format 606 to client device 112. Client device 112 may process the received data as described herein to provide a user experience 608 based on the digital content.

At any suitable point or points along pipeline 600, pipeline tool operations may be performed as part of processing digital content, including as part of converting digital content from one format to another format. For example, such tool operations may be performed by content management system 104 when converting digital content from a first hierarchical data format to a second hierarchical data format and/or by content delivery system 106 when using digital content in a hierarchical data format to generate digital content in a flat data format. Examples of such tool operations may include atlasing textures to generate a texture atlas, batching meshes, atlasing models to generate a model atlas and/or to adjust texture UV information in models to work with a model atlas and/or a texture atlas, batching models by combining models that share a common graphical attribute (e.g., a shared material) to form one model, preparing batched models for a lightmapper (e.g., by creating a second set of UVs to be used to map lightmapping information), and generating lighting information. These operations are illustrative of certain examples. Additional or alternative operations may be performed in other examples.

Returning to FIG. 1, in certain examples, content provider system 102 may be implemented as or to include one or more cloud servers. In such implementations, content delivery system 106 may stream digital content in a flat data format from one or more cloud servers to client device 112 over network 114.

In certain other examples, content provider system 102 may be implemented using an edge compute configuration in which at least some elements and operations of content provider system 102 are implemented as or to include one or more edge computing servers. In such implementations, content delivery system 106 may stream digital content in a flat data format from one or more edge computing servers to client device 112 over network, or from a combination of one or more edge computing servers and one or more cloud servers to client device 112 over network. By delivering digital content in a flat data format from an edge computing server instead of from a cloud server, content delivery system 106 may further reduce latencies for delivery of the digital content to client device 106 because the edge computing server is more proximate, in terms of latency, to client device 112 than cloud server is to client device 112.

Figure 7:
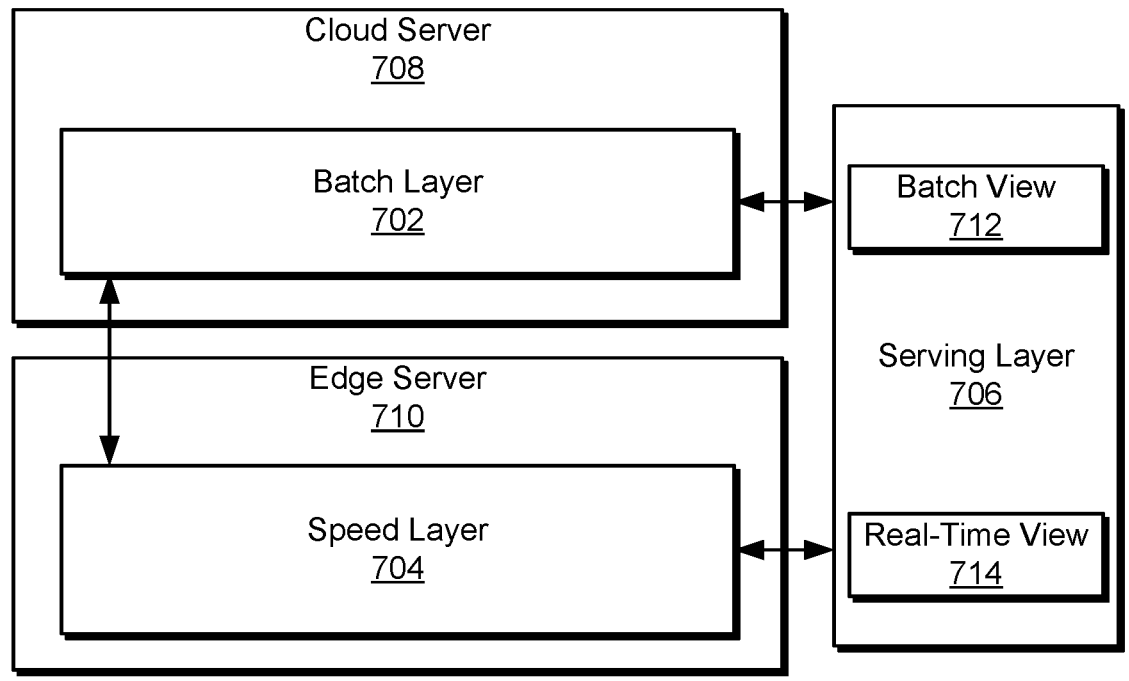
FIG. 7 illustrates an exemplary distributed data-processing architecture for delivery of digital content according to principles described herein.

In certain examples, content delivery system 106 may be configured to implement a distributed data-processing architecture to provide digital content over network 114. FIG. 7 illustrates an exemplary distributed data-processing architecture 700 for delivery of digital content. As shown, distributed data-processing architecture 700 may include a batch layer 702, a speed layer 704, and a serving layer 706.

In the example shown in FIG. 7, batch layer 702 may be implemented by a cloud server 708, which may include one or more cloud computing devices. Batch layer 702 may be configured to manage and/or process on a complete master dataset, which dataset may be an immutable, append-only set of raw data is some implementations. Batch layer 702 may precompute on the dataset and generate batch views that may be requested by client device 112. In certain examples, batch layer 702 may be configured to precompute arbitrary query functions to generate the batch views. Batch layer 702 may be configured to maximize accuracy and completeness by processing all available data when generating views, which may allow batch layer 702 to fix errors by computing based on the complete dataset and updating existing views. Batch layer 702 may be configured to use a distributed processing system located within the cloud and capable of handling large quantities of data. Batch layer 702 may be configured to perform latency-tolerant manipulation of the dataset.

In the example shown in FIG. 7, speed layer 704 may be implemented by an edge server 710, which may include one or more edge computing devices. Speed layer 704 may be configured to process on a dataset (e.g., one or more data streams) in real time or near real time. To this end, speed layer 704 may use fast and incremental algorithms to process, with minimal latency, the most recent data to generate real-time views that may be requested by client device 112. Speed layer 704 may accommodate latency-sensitive requests, i.e., requests that are subject to low latency requirements. Speed layer 704 may be configured to minimize latency so that real-time views are made available almost immediately after data is received. By positioning speed layer 704 at edge server 710 at an edge of network 114 instead of at cloud server 708 with batch layer 702, speed layer 704 may receive data from client device 112 more quickly and make real-time views available to client device 112 more quickly than if speed layer 704 was implemented at a same network level as batch layer 702 (e.g., together with batch layer 702 in the cloud). In addition, in certain examples, speed layer 704 may facilitate input and/or output functions and logic that can exist off client device 112.

Serving layer 706 may be implemented at any suitable network level, including in the cloud and/or at an edge of network 114. Serving layer 706 may be configured to serve content, such as a batch view 712 generated by batch layer 702 and/or a real-time view 714 generated by speed layer 704, to client device 112 over network 114.

As part of or in addition to providing batch view 712 and real-time view 714 to client device 112 over network 114, serving layer 706 may provide digital content to client device 112 over network 114 for use by client device 112 to provide a user experience. To this end, digital content processed by content management system 104 and/or content delivery system 106 may be accessible to and/or served by serving layer 706. For example, serving layer 706 may access digital content stored in a data repository by content management system 104 and/or staged by content delivery system 106 and provide the digital content to client device 112 over network 114. Specifically, serving layer 706 may stage digital content in a flat data format for streaming to client device 112 over network 114.

Figure 8:
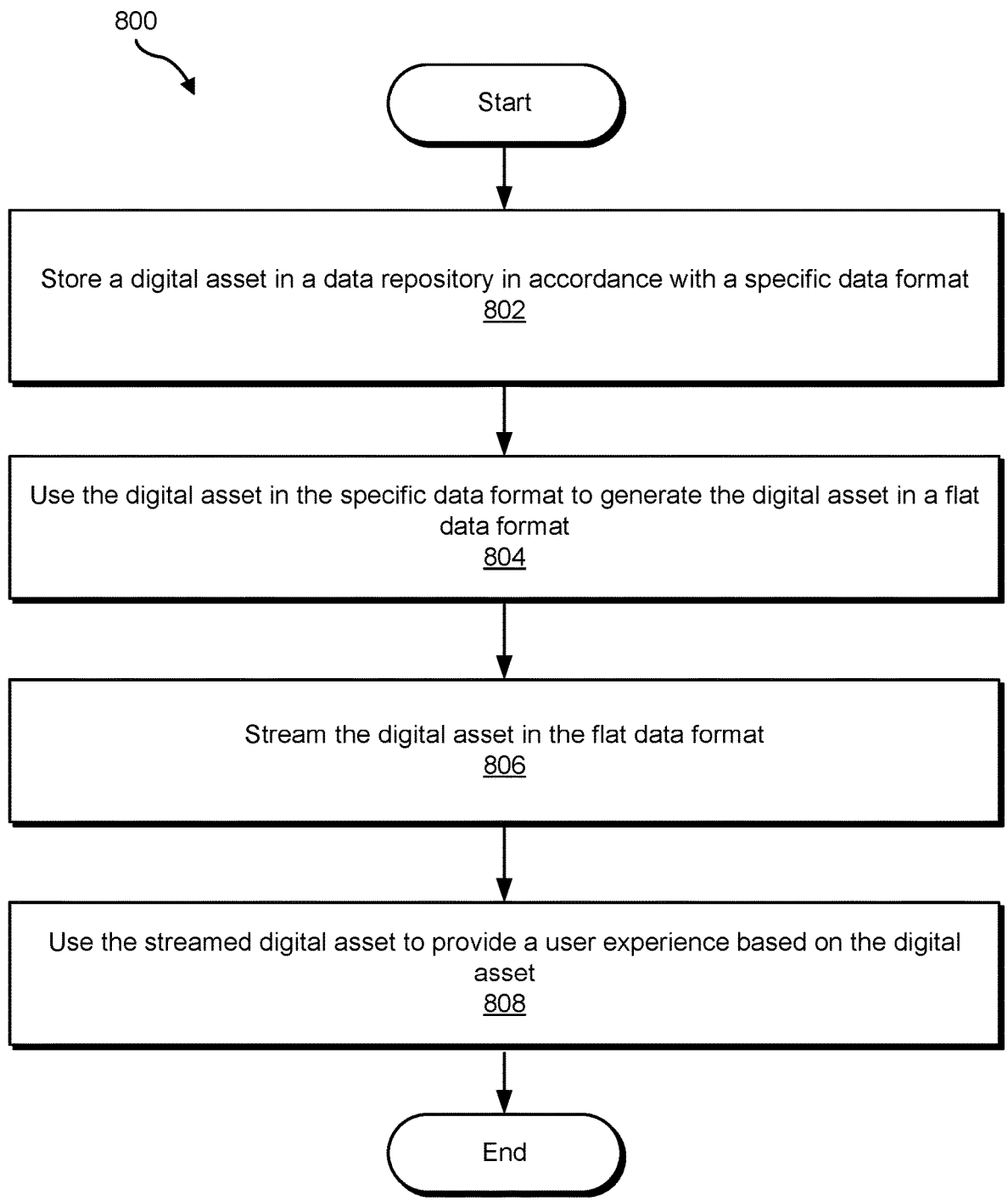
FIGS. 8-9 illustrate exemplary methods of managing and delivering digital content according to principles described herein.
Figure 9:
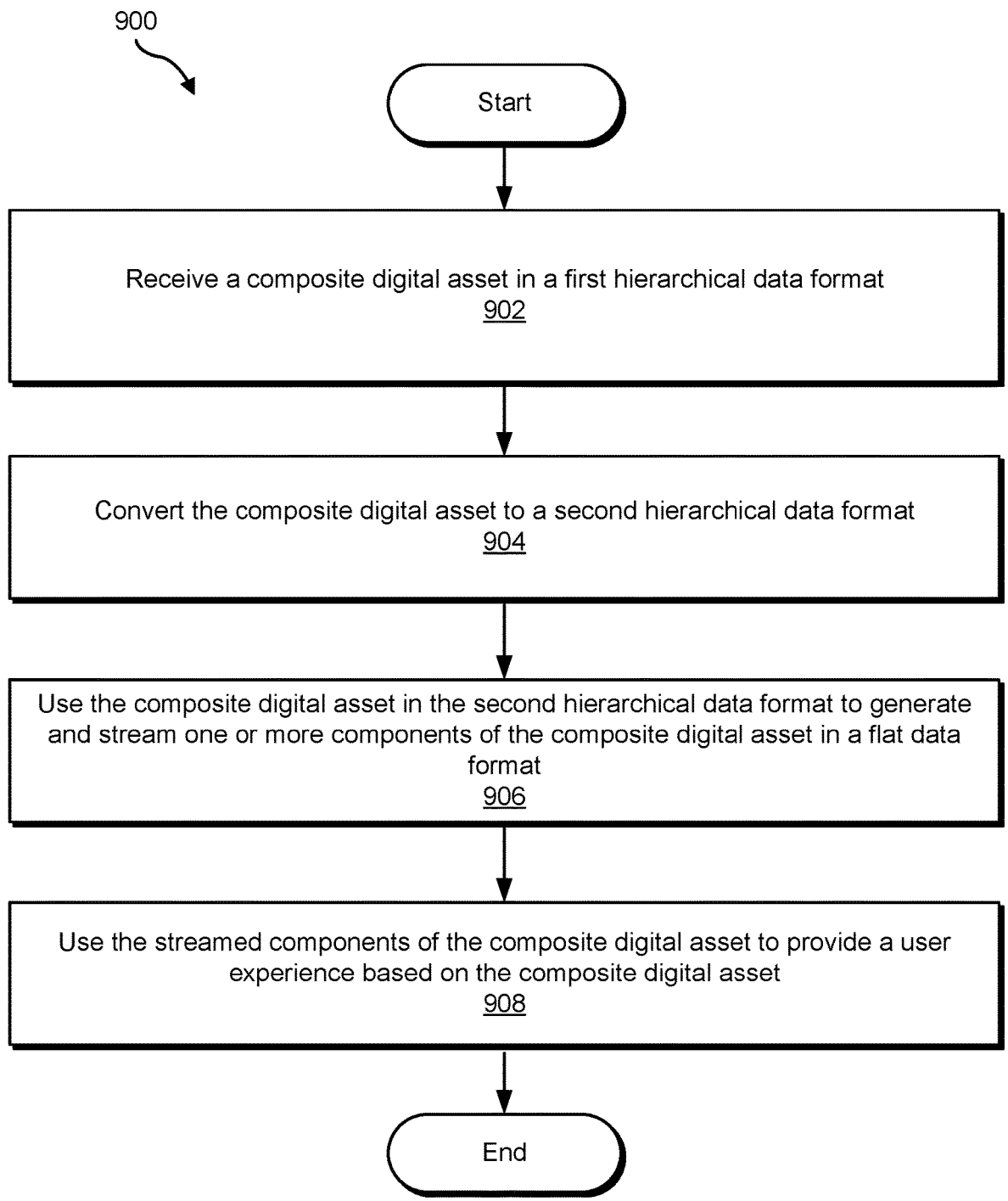

FIGS. 8-9 illustrate exemplary methods of managing and delivering digital content according to principles described herein. While FIGS. 8-9 illustrate exemplary operations according to certain embodiments, other embodiments may omit, add to, reorder, and/or modify any of the operations shown in FIGS. 8-9. One or more of the operations shown in FIGS. 8-9 may be performed by a system described herein and/or any component(s) or implementation(s) thereof.

Turning to method 800 shown in FIG. 8, in operation 802, a digital asset is stored in a data repository in accordance with a specific data format. Operation 802 may be performed in any of the ways described herein. For example, content management system 104 may store, in a data repository, a composite digital asset in accordance with a hierarchical data format in which components of the composite digital asset are represented as nodes in a graph database and relationships between the components are represented as edges between the nodes in the graph database.

In operation 804, the digital asset stored in accordance with the specific data format is used to generate the digital asset in a flat data format. Operation 804 may be performed in any of the ways described herein. For example, content delivery system 106 may use a composite digital asset stored in accordance with a hierarchical data format to generate the composite digital asset in a flat data format.

In operation 806, the digital asset in the flat data format is streamed. Operation 806 may be performed in any of the ways described herein. For example, content delivery system 106 may stream a composite digital asset in the flat data format over a network to a client device.

In operation 808, the digital asset streamed in the flat data format is used to provide a user experience based on the digital asset. Operation 808 may be performed in any of the ways described herein. For example, a client executing on a client device may use a composite digital asset streamed in the flat data format to provide a user experience based on the composite digital asset.

Turning to method 900 shown in FIG. 9, in operation 902, a composite digital asset is received in a first hierarchical data format. Operation 902 may be performed in any of the ways described herein. For example, content management system 104 may receive the composite digital asset in the first hierarchical data format from a user device such as user device 108.

In operation 904, the composite digital asset is converted to a second hierarchical data format. Operation 904 may be performed in any of the ways described herein. For example, content management system 104 may convert the composite digital asset to the second hierarchical data format by breaking out grouped components included in the composite digital asset in the first hierarchical data format into individual components and representing the individual components as a plurality of nodes and hierarchical relationships between the nodes in a graph database.

In operation 906, the composite digital asset in the second hierarchical data format is used to generate and stream one or more components of the composite digital asset in a flat data format. Operation 906 may be performed in any of the ways described herein. For example, content delivery system 106 may use the composite digital asset in the second hierarchical data format to generate and stream one or more of the individual components of the composite digital asset in the flat data format over a network to a client device in response to a request, from the client device, to access the one or more of the individual components of the composite digital asset.

In operation 908, the components of the composite digital asset streamed in the flat data format are used to provide a user experience based on the composite digital asset. Operation 908 may be performed in any of the ways described herein.

While certain examples described herein have been described in terms of a single client and client device accessing digital content from content delivery system 106, this is illustrative only. In certain implementations, multiple clients implemented on respective client devices may concurrently access digital content from content delivery system 106. In such implementations, a one-to-one relationship between a distinct data-processing architecture and a client is not required and scaling is not limited to linear scaling. Rather, systems and methods described herein may provide digital content as a service in a manner that supports a one-to-many relationship and allows scaling that is more economical than linear scaling.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor, a CPU, a GPU, etc.) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
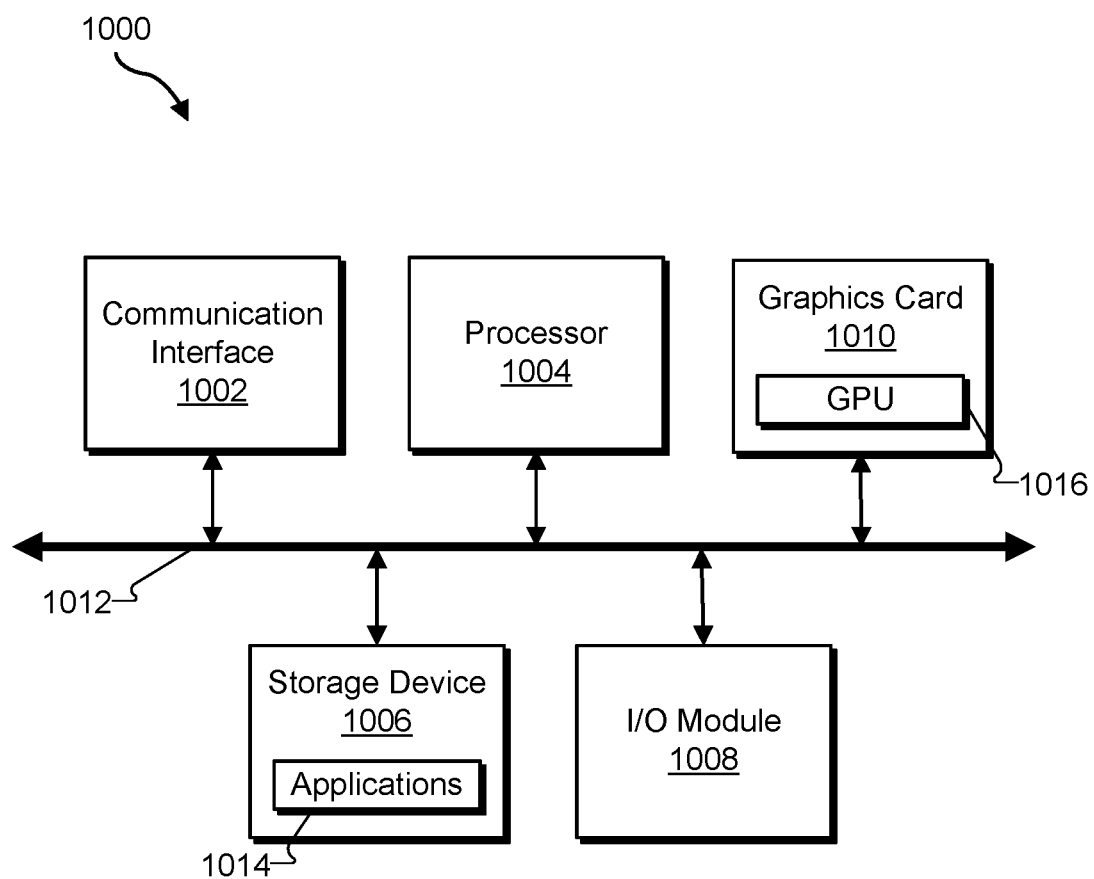
FIG. 10 illustrates an exemplary computing device according to principles described herein.

FIG. 10 illustrates an exemplary computing device 1000 that may be specifically configured to perform one or more of the processes described herein. As shown in FIG. 10, computing device 1000 may include a communication interface 1002, a processor 1004, a storage device 1006, an input/output ("I/O") module 1008, and a graphics card 1010 communicatively connected via a communication infrastructure 1012. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit (e.g., a CPU) capable of processing data or interpreting, executing, and/or directing execution of one or more of the instructions, processes, and/or operations described herein. Processor 1004 may direct execution of operations in accordance with one or more applications 1014 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1014 configured to direct processor 1004 to perform any of the operations described herein may be stored within storage device 1006. In some examples, data may be arranged in one or more databases residing within storage device 1006. In certain examples, storage device 1006 may maintain surface data, metadata, data streams, video streams, transport streams, and/or any other data received, generated, managed, maintained, used, and/or transmitted by facilities 106 through 116. The storage facility may further include any other data as may be used by facilities 106 through 116 to perform one of more of the operations described herein.

I/O module 1008 may include one or more I/O modules configured to receive user input and provide user output. One or more I/O modules may be used to receive input for a single virtual reality experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation. I/O module 1008 may be omitted from certain implementations.

In some examples, any of the system components described herein may be implemented by or within one or more components of computing device 1000. For example, one or more applications 1014 residing within storage device 1006 may be configured to direct processor 1004 to perform one or more processes or functions associated with content provider system 102, content management system 104, content delivery system 106, user device 108, client device 112, client 116, and/or other components described herein. Likewise, any suitable storage facility described herein, such as data repository 506, may be implemented by or within storage device 1006. Accordingly, computing device 1000 may represent an exemplary implementation of content provider system 102, content management system 104, content delivery system 106, user device 108, or client device 112.

Graphics card 1010 may include any suitable graphics card (e.g., a commercially available graphics card) having dedicated video decoding hardware (e.g., one or more dedicated video decoders) and a programable GPU 1016. Graphics card 1010 may include additional components in certain embodiments. Graphics card 1010 and/or GPU 1016 may be configured to execute and/or assist processor 1004 in executing one or more of the exemplary operations described herein. Graphics card 1010 may include any suitable number of graphics cards and/or GPUs as may suit a particular implementation.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving a composite digital asset in a first hierarchical data format, the composite digital asset including a plurality of grouped components;
   converting the composite digital asset to a second hierarchical data format by breaking out the plurality of grouped components into individual components and representing the individual components as a plurality of nodes and hierarchical relationships between the nodes in a graph database, the plurality of nodes including a node that is shared with an additional plurality of nodes representing an additional composite digital asset in the graph database;
   storing a build map for the composite digital asset in the second hierarchical data format, the build map representing the composite digital asset and a build history of tracked operations performed to create the composite digital asset;
   storing a delivery map for the composite digital asset in the second hierarchical data format, the delivery map generated from the build map and representing the composite digital asset; and
   using the delivery map for the composite digital asset in the second hierarchical data format to generate and stream one or more of the individual components of the composite digital asset in a flat data format over a network to a client device in response to a request, from the client device, to access the one or more of the individual components of the composite digital asset.

2. The method of claim 1, wherein the composite digital asset in the flat data format is configured to be loaded directly, without decompression, into a processing unit memory buffer of the client device for use by a client executing on the client device to provide a user experience based on the composite digital asset.

3. The method of claim 1, wherein:
the composite digital asset comprises a three-dimensional (3D) model of a virtual object; and
the client device comprises a client executing on the client device and configured to render the 3D model of the virtual object as part of providing a user experience based on the composite digital asset.

4. The method of claim 1, wherein the using of the delivery map for the composite digital asset in the second hierarchical data format to generate and stream the one or more of the individual components of the composite digital asset in the flat data format is performed in real time in response to the request, from the client device, to access the one or more of the individual components of the composite digital asset.

5. The method of claim 1, further comprising:
staging at least one of the composite digital asset in the second hierarchical data format and the composite digital asset in the flat data format at an edge server;
wherein the streaming of the composite digital asset in the flat data format comprises streaming the composite digital asset in the flat data format from the edge server to the client device over the network.

6. The method of claim 1, embodied as computer-executable instructions on at least one non-transitory computer-readable medium.

7. The method of claim 1, wherein:
the node that is shared with the additional plurality of nodes represents an individual component of the individual components; and
the representing the individual components as the plurality of nodes and hierarchical relationships between the nodes in the graph database comprises:
determining that the individual component is already represented by the node in the graph database; and
linking one or more nodes of the plurality of nodes to the node that already represents the individual component in the graph database.

8. The method of claim 1, wherein the node that is shared with the additional plurality of nodes represents one of the individual components as having a relationship with the composite digital asset and a relationship with the additional composite digital asset represented in the graph database.

9. The method of claim 1, wherein the individual components comprise:
a three-dimensional mesh that defines a surface of a virtual object; and
at least one of an image, a texture, a material, or a shader linked to the mesh.

10. A method comprising:
storing, by a content provider system in a data repository, a composite digital asset in accordance with a hierarchical data format in which components of the composite digital asset are represented as nodes in a graph database and relationships between the components are represented as edges between the nodes in the graph database, the nodes including a node that is shared with a representation of an additional composite digital asset in the graph database;
wherein the storing of the composite digital asset in accordance with the hierarchical data format comprises:
storing a build map for the composite digital asset in the data repository, the build map representing the composite digital asset and a build history of tracked operations performed to create the composite digital asset, and
storing a delivery map for the composite digital asset in the data repository, the delivery map generated from the build map and representing the composite digital image;
using, by the content provider system, the delivery map for the composite digital asset stored in accordance with the hierarchical data format to generate the composite digital asset in a flat data format; and
streaming, by the content provider system, the composite digital asset in the flat data format over a network to a client device in response to a request, from the client device, to access the composite digital asset, the composite digital asset in the flat data format configured to be used by a client executing on the client device to provide a user experience based on the composite digital asset.

11. The method of claim 10, wherein the composite digital asset in the flat data format is configured to be loaded directly, without decompression, into a graphical processing unit (GPU) memory buffer of the client device for use by the client to provide the user experience based on the composite digital asset.

12. The method of claim 10, wherein:
the composite digital asset comprises a three-dimensional (3D) model of a virtual object; and
the client comprises a rendering component configured to render the 3D model of the virtual object as part of providing the user experience.

13. The method of claim 10, further comprising:
receiving the composite digital asset in a package hierarchical data format in which the components of the composite digital asset are packaged in accordance with the packaged hierarchical data format; and
converting the composite digital asset from the package hierarchical data format to the hierarchical data format by breaking out the packaged components into individual components and representing the individual components as the nodes in the graph database.

14. The method of claim 10, wherein the delivery map is generated from the build map by removing data representative of the build history from the build map for the composite digital asset in the data repository.

15. The method of claim 10, further comprising:
staging, by the content provider system, at least one of the composite digital asset in accordance with the hierarchical data format and the composite digital asset in the flat data format at an edge server;
wherein the streaming of the composite digital asset in the flat data format comprises streaming the composite digital asset in the flat data format from the edge server to the client device over the network.

16. The method of claim 10, embodied as computer-executable instructions on at least one non-transitory computer-readable medium.

17. A system comprising:
a content management system including at least one physical computing device configured to:
receive a composite digital asset in a first hierarchical data format, the composite digital asset including a plurality of grouped components; and
convert the composite digital asset to a second hierarchical data format by breaking out the grouped components into individual components and representing the individual components as a plurality of nodes and hierarchical relationships between the nodes in a graph database, the plurality of nodes including a node that is shared with an additional plurality of nodes representing an additional composite digital asset in the graph database;

store a build map for the composite digital asset in the second hierarchical data format, the build map representing the composite digital asset and a build history of tracked operations performed to create the composite digital asset;

store a delivery map for the composite digital asset in the second hierarchical data format, the delivery map generated from the build map and representing the composite digital asset; and a content delivery system communicatively coupled to the content management system and including at least one physical computing device configured to use the delivery map for the composite digital asset in the second hierarchical data format to generate and stream one or more of the individual components of the composite digital asset in a flat data format over a network to a client device in response to a request, from the client device, to access the one or more of the individual components of the composite digital asset.

18. The system of claim 17, wherein the composite digital asset in the flat data format is configured to be loaded directly, without decompression, into a graphical processing unit (GPU) memory buffer of the client device for use by a client executing on the client device to provide a user experience based on the composite digital asset.

19. The system of claim 17, wherein:
the composite digital asset comprises a three-dimensional (3D) model of a virtual object; and
the client device comprises a client executing on the client device and configured to render the 3D model of the virtual object as part of providing a user experience based on the composite digital asset.

20. The system of claim 17, wherein the content delivery system is further configured to:
stage at least one of the composite digital asset in the second hierarchical data format and the composite digital asset in the flat data format at an edge server;
stream the composite digital asset in the flat data format from the edge server to the client device over the network.

* * * * *